United States Patent [19]

Wolcott

[11] 4,087,225
[45] May 2, 1978

[54] APPARATUS FOR FLARING PLASTIC TUBING

[75] Inventor: Glenn R. Wolcott, Dayton, Ohio

[73] Assignee: Papco Tool Corporation, Dayton, Ohio

[21] Appl. No.: 744,189

[22] Filed: Nov. 22, 1976

[51] Int. Cl.² .................................................. B29C 17/00
[52] U.S. Cl. .......................................... 425/392; 72/117; 72/125; 72/317
[58] Field of Search ..................... 425/392, 451.9, 393; 72/117, 125, 317

[56] References Cited

U.S. PATENT DOCUMENTS

| Re. 25,131 | 3/1962 | Wilson | 72/317 |
|---|---|---|---|
| 1,955,119 | 4/1934 | Fantz | 72/125 X |
| 2,442,495 | 6/1948 | Hull et al. | 72/117 |
| 2,484,632 | 10/1949 | Marsh | 72/117 |
| 2,711,773 | 6/1955 | Wilson | 72/125 |
| 2,924,263 | 2/1960 | Landis | 72/117 |
| 2,936,810 | 5/1960 | Franck | 72/117 |

Primary Examiner—Robert L. Spicer, Jr.
Attorney, Agent, or Firm—Biebel, French & Nauman

[57] ABSTRACT

An apparatus for flaring plastic tubing comprising a motor and speed reducing unit mounted on a slide member for relative movement towards and away from a set of stationary die members in which various diameters of plastic tubing may be inserted. A flaring head is mounted on the output shaft of the speed reducing unit in alignment with the central axis of a tubing positioned in the dies. The maximum forward and rearward movement of the slide member is adjustable so that the necessary movement for producing the desired flare on various diameters of tubing can be produced.

10 Claims, 9 Drawing Figures

APPARATUS FOR FLARING PLASTIC TUBING

BACKGROUND OF THE INVENTION

1. Field of the Invention

This invention relates to apparatus for flaring the ends of tubing and more particularly, to powered apparatus for flaring the ends of plastic tubing of the type used in residential water plumbing and the like.

2. Prior Art

In the art of tube flaring particularly in residential plumbing applications, it has been a common expedient to use hand held flaring tools in which a die or dies are provided to hold the tubing to be flared and a flaring cone is mounted to a threaded member supported coaxially in front of the end of the tube to be flared so that by rotating the threaded member in the correspondingly threaded support bracket, the end of the tube will be pushed outwardly to be flared at the desired angle. These flaring devices were developed particularly for use in flaring copper or other metal tubing which can be deformed to the desired position merely by the application of pressure to remold the shape of the end of the tube.

Such hand held flaring tools were sufficiently efficient for the uses for which they were intended since plumbers generally would measure and cut the necessary length of tubing on location, just prior to installing each individual piece of tubing and, thus, it was not necessary to have a highly efficient mass-producing flaring tool which could be used to flare pieces of tubing in advance of their immediate use.

Hand held tools are of course much more portable and may be carried in the tool box of the plumber rather than requiring special transport to the individual job sight as would be necessary in a larger, more fully automated, flaring device. However, with the advent of modular residential homes, mobile homes and the like, which could utilize precut and preformed lengths of tubing, it became advantageous to consider a more automated version of the prior art hand held tools.

In addition, the use of certain types of plastic tubing in place of copper and other metal tubing has increased substantially due to the relative cost savings. Such plastic tubing made, for example, of polybutylene, polyethylene, polyvinyl, and other similar plastic materials which are thermoplastic in nature and contain a memory unless certain pressure and temperature conditions are met which cause the material to become deformable so that it will retain its new shape, has created additional problems in the tube flaring art since conventional tools are not readily adaptable to the reforming of such plastic tubing.

Applicant himself has developed a special flaring tool which is believed to overcome the difficulties associated with the prior art devices for flaring plastic tubing of the nature mentioned above. This device is disclosed in applicant's copending United States patent application Ser. No. 607,225. This device, however, is in the form of a hand held tool utilizing a special flaring head and does not, therefore, provide a more automated means of flaring such plastic tubing than would prior art tools utilized in flaring copper or other metal tubings.

SUMMARY OF THE INVENTION

The present invention provides a novel means for automatically flaring plastic tubing, particularly of the type previously mentioned, so that greater production economy may be obtained as well as desired levels of uniformity in the shape and dimensions of the flare.

These advantages are obtained over the prior art devices by providing a motor and speed reducing unit rigidly secured to a slide member which in turn is mounted on a frame member for translational movement relative thereto, and a flaring device secured to the output shaft of the speed reducing means for rotation therewith in coaxially aligned relation with a pair of die members which clamp the plastic tubing to be flared.

The flaring tool, which is mounted to the output drive shaft of the speed reducing means, is preferably of the type of applicant's own above mentioned novel design of flaring tool which has a generally conical working face coaxially disposed with the axis of the output drive shaft of the speed reducing unit, and which has a working face with a plurality of spaced conical lands extending at a greater angle than the remaining surface portions of the tool face relative to the central axis and extending substantially from the apex of the conical working face. This particular design permits the end of the plastic tubing to be worked in an undulating manner that causes heat generation sufficient to create plastic flow of the material and to destroy its "memory" so that the flare will remain in the tubing once it is removed from the apparatus.

The die members which hold the tubing by frictional engagement are preferably a pair of die blocks which have defined in each of their side surfaces a different diameter semicylindrical opening aligned with the axis of rotation of each block that will permit a pair of die blocks to be joined together to clamp a corresponding diameter of tubing in position. This design permits a variety of diameters of plastic tubing to be flared in the apparatus by merely rotating each of the die blocks so that corresponding diameter openings will be aligned when the blocks are moved together.

A movable support is provided for one of the die blocks to permit the die to be opened so that a piece of tubing may be inserted in or removed laterally from the die. An over-center locking cam mechanism is also provided which holds the die blocks in frictional engagement with the tubing while the flare is being formed. The over-center locking cam mechanism is attached to the movable support and supported by the frame member of the apparatus so that movement of the cam mechanism moves the support, and thus the die block secured thereto, towards and away from the other die block.

A chain and sprocket arrangement is provided beneath the slide member so that the flaring member can be moved rearward relative to the die to permit sufficient room for the tube to be inserted and to move forward far enough to provided the desired flaring on the tubing. A lever arm is provided on one sprocket shaft so that the desired forward and rearward motion of the slide member can be manually obtained.

Limit stops are also provided at each end of the slide member, which are adjustable to permit the slide member to move the necessary distance forward or rearward relative to the die depending on the size of tubing being flared. Use of the limit stops permits production of substantially identical flared end portions on as many pieces of the same diameter tubing as is desired.

DETAILED DESCRIPTION OF THE PREFERRED EMBODIMENT

Figure 1:
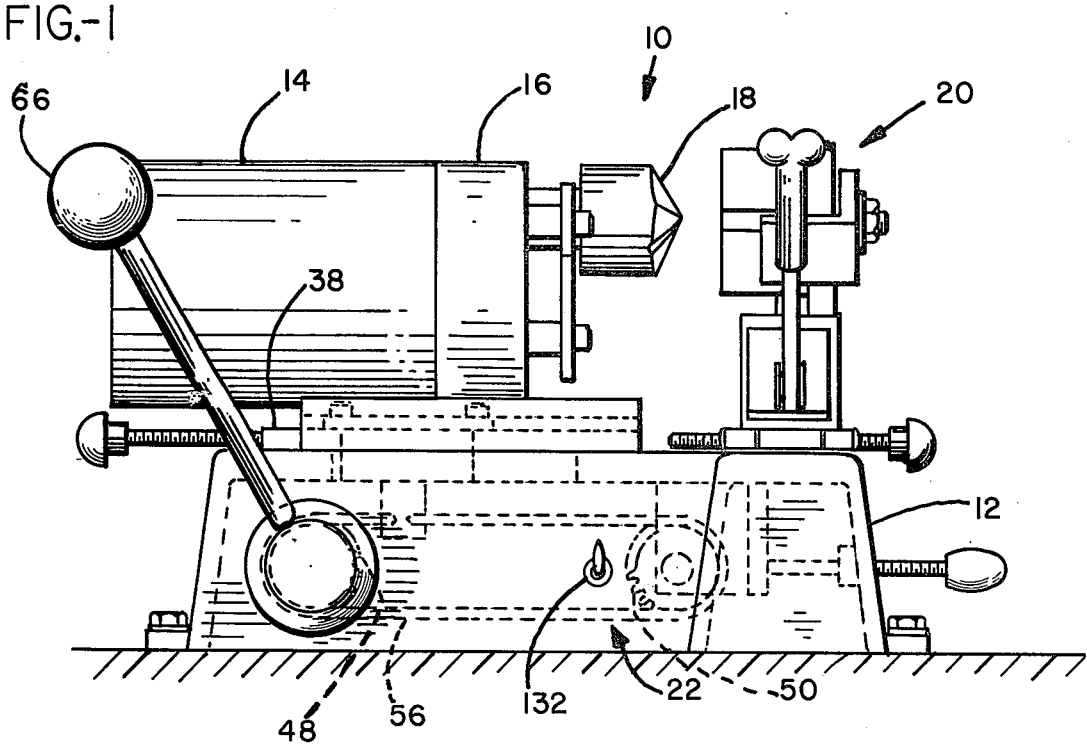
FIG. 1 is a side elevation of a preferred embodiment of the present invention.

The basic apparatus 10 is comprised of a frame member 12, a motor 14, a speed reducing unit 16, a flaring device 18 secured to the output shaft of the speed reducing unit, a set of die blocks 20 for holding the tubing to be flared and a sprocket and chain drive mechanism 22 for moving the flaring device 18 relative to the die blocks 20.

The motor 14 is of any conventional type which will provide the necessary torque and speed characteristics when coupled with the speed reducing unit 16 to produce the desired flare on the end of the tubing. The speed reducing unit 16 is likewise of conventional design and is selected on the basis of reducing the speed output of the motor 14 to the lower speed and higher torque required to flare the tubing with the flaring device 18.

Although both the motor member 14 and speed reducing unit 16 may be purchased separately and interconnected by conventional means, it has been proven advantageous to use a single unit which combines both the motor 14 and speed reducing unit 16. Such a unit is obtainable from Dayton Electric Manufacturing Company of Chicago, Illinois, and is designated model No. 3M138.

The flaring device 18 which can be of any conventional design if it is desired to use the machine for flaring conventional metal tubing such as copper, is preferably of the construction illustrated in FIGS. 5-9, when the apparatus 10 is used for flaring plastic tubing such as polyvinyl, polyethelene, polybutlene, and the like. The head portion 24, as mentioned previously, is the subject of a separate United States patent application of the applicant, but is deemed to be particularly useful in connection with the present invention. In addition, certain variations, as will be described in detail below, have been incorporated into the flaring head 24 of the flaring device 18 since these adaptions have proved particularly advantageous in the use of automated equipment for flaring plastic tubing. It should be noted, however, that the flaring head described in applicant's prior mentioned application works quite satisfactorily in combination with the present apparatus.

Figure 9:
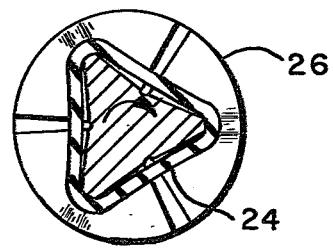
FIG. 9 is a cross sectional view of the flaring head of FIG. 6 with a cross section of a piece of plastic tubing being flared.

The flaring head 24 is basically constructed, for example, from a cylindrical piece of tool steel with a conical working face 25 being formed on one end of the cylinder 26. A series of relieved areas or recesses 28 are then cut into the conical portion of the flaring head 24 at a lesser angle relative to the central axis of the flaring member 18 than the angle of the remaining land portions 30 of the original cone. This produces a recessed area at spaced intervals alternating with the conical lands 30 so that when the flaring head 24 is engaged with the end of a piece of plastic tubing, the plastic tubing will undulate between the conical lands 30 and the recesses 28 when the flaring head 24 is rotated, as is shown in FIG. 9.

It is believed that this undulating motion produces the required heat generation necessary to cause the plastic material to enter the deformable state in which the previous "memory" of the material is erased and the flare can be permanently formed on the end portion of the tubing.

Figure 6:
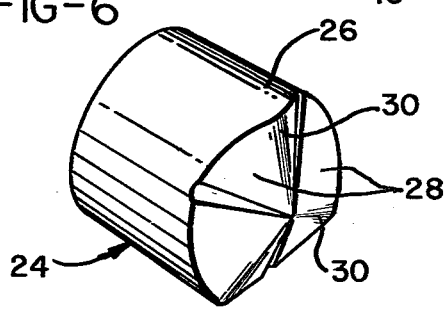
FIG. 6 is a pictorial view of the flaring means.
Figure 7:
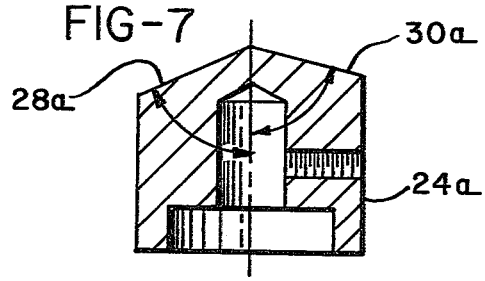
FIG. 7 is a cross sectional view of an alternative form of flaring head.
Figure 8:
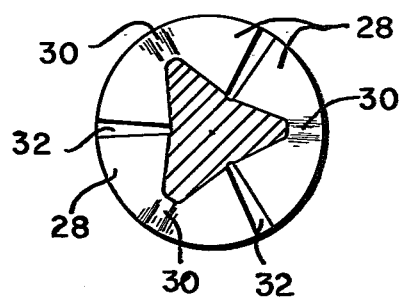
FIG. 8 is a cross sectional view of the flaring head of FIG. 6.

Although the lands formed in the flaring head 24 may be flat segments through the surface of the conical end of the head, as shown in FIG. 7, or inside radiused portions (not shown), either of which produces a relieved area in the working face of the tool, the preferred construction is as illustrated in FIGS. 6 and 8.

In this preferred construction of the flaring head 24, a series of compound angled lands are formed at equally spaced intervals around the surface of the conical portion 25 so that the narrow conical lands 30 remain to separate the adjacent relieved areas 28, and the angle of the lands and of the relieved portions converge and meet at the apex of the flaring head 24. Adjacent areas 28 not separated by a land 30 are angled towards one another to produce a central valley in which a further shallow groove 32 is preferably machined in order to permit lubrication of the flaring head 24 while it is flaring a piece of tubing.

The grooves 32 have proved to be particularly useful when larger diameters of plastic tubing, such as those over one inch in diameter, are being flared. The grooves 34 can easily be cut in the surfaces of flat lands or inside radiused lands if the flaring head 24 is formed in that manner, as mentioned above.

The surface area of the lands 30 in preferably quite small relative to the surface area of the recesses 28 so that substantial undulation of the tubing is created between the "peaks" produced by the lands 30 and the "valleys" produced by the recesses 28. It has been found that the angle of the conical lands 30 relative to the central axis should be substantially in the range of 65° to 75° in order to produce the desired undulation, and the angle of a flat area such as 28a, shown in FIG. 7, should be substantially 58.5° relative to the central axis of the flaring head 24a in order to produce the desired flare in the plastic tubing. The angle of the relieved areas relative to the central axis may of course be varied from 58.5°, but, the useful range within which this angle may be varied has not yet been established, although this may be easily accomplished by experimentation.

In the case of the areas 28 which are of a compound angle, they should preferably have an angle at the valley portion thereof wherein the groove 32 is cut, relative to the central axis of the flaring head 24, in the range of 65° to 75° as in the case with the embodiment shown in FIG. 7. The areas 28 which are formed with a compound angle relative to the central axis of the flaring head 24 can be varied between positions which would form the flat areas 28a of the embodiment illustrated in FIG. 7, and a position in which the valley formed between them would have an angle of approximately 25°, although again, the exact range within which the angle is optimum has not been established, but can easily be determined by simple experimentation.

The undulation of the plastic tubing 36 is illustrated in FIG. 9 where a cross section of the flaring head 24 is shown with a cross section of the tubing 36 in what is believed to be the shape of the plastic tubing with the flaring head inserted in the end thereof. As the flaring head is rotated, different portions of the tubing will undulate since the tubing remains stationary during rotation of the flaring head.

Referring again to FIGS. 1 and 2, the motor 14 and speed reduction unit 16 are securely mounted to a slide member 38 which in turn is mounted on the frame member 12 for relative translational movement along the central axis of the flaring device 18. The slide member 38 is captive in a pair of channels 40 and 42 formed in the top surface of the frame member 12.

A pair of adjustable limit screws 44 and 46 are provided to limit the forward and rearward movement of the slide member 38 within the channels 40 and 42. The rear limit screw 44 permits the slide member to be moved rearwardly a sufficient distance to permit a piece of tubing to be positioned in the die blocks 20. The forward limit screw 46 permits the slide member 38 to move sufficiently forward that the flaring head 24 will produce the desired flare on a piece of tubing inserted into the die. Both the limit screws 44 and 46 may be adjusted to produce the desired limits of movement of the slide member 38, depending upon the diameter of tubing to be flared.

Figure 4:
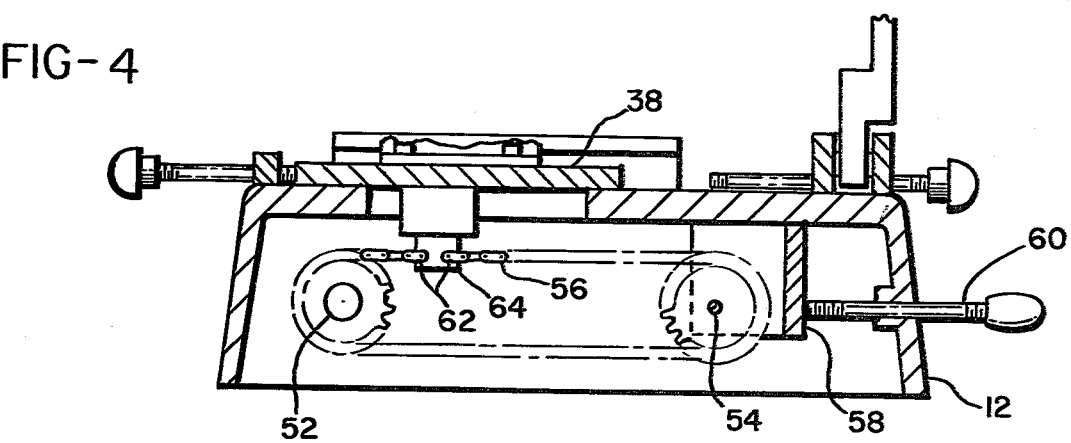
FIG. 4 is a partial cross sectional side view of the embodiment illustrated in FIG. 1 with the motor and speed reduction unit removed.

In order to move the slide member 38 forward and rearward to engage and disengage the flaring head 24 with a piece of tubing to be flared, a drive mechanism 22 is provided which, in the preferred embodiment, basically comprises a pair of sprockets 48 and 50, supported on drive shafts 52 and 54, respectively, as shown in FIGS. 1 and 4. Supported by sprockets 48 and 50 is a chain 56 which intermeshes with and is driven by the sprockets. A bracket 58 is supported in the frame member 12 by means of an adjustment screw 60. The bracket 58 rotatably supports drive shaft 54 on which sprocket 50 is mounted so that the chain 56 may be tightened or loosened as is desired, merely by rotating screw member 60. The upper surface of bracket 58 slides on the bottom surface of the frame member 12 in order to maintain the sprocket 50 in vertical alignment with the sprocket 48 whose shaft 52 is rotatably mounted in the frame member 12.

The ends 62 of chain member 56 are secured to a rigid mounting bracket 64 which is formed integral with or secured to the slide member 38.

On one end of the drive shaft 52 which extends outside the frame member 12, a handle 66 is secured so as to rotate with the drive shaft 52. In operation, rotation of the handle 66 will cause forward and rearward movements of the slide member 38 between the limit screws 44 and 46 in order to produce the flaring of the plastic tubing.

Although a sprocket and chain drive mechanism 22 is illustrated in the preferred embodiment, any motion which will produce the translational movement of the slide 38 may be utilized. For example, a simple rack and pinion mechanism could be utilized. In addition, though manual operation is illustrated in the preferred embodiment by the provision of handle 66, means may be utilized for automatically advancing or retracting the flaring head 18 at a desired rate of speed.

Figure 5:
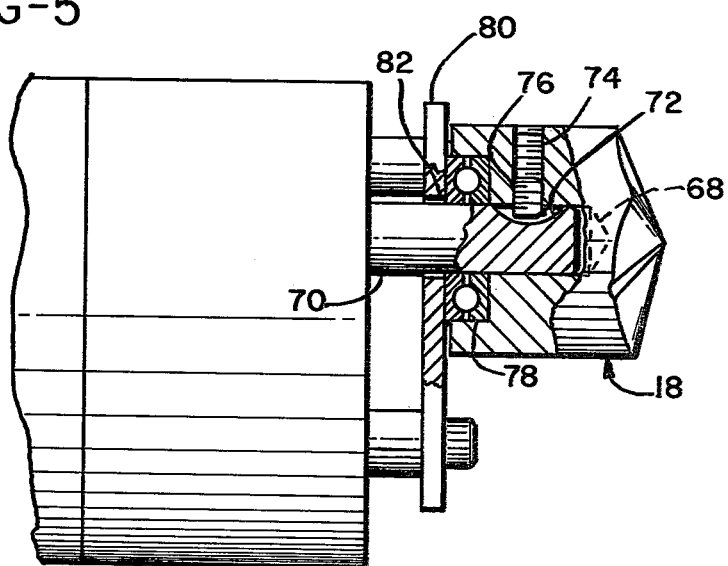
FIG. 5 is a partially broken out enlarged view of the motor and flaring device of the embodiment illustrated in FIG. 1.

The manner of connection between the speed reducing unit 16 and the flaring member 18 is best illustrated in FIG. 5. The rear cylindrical portion 26 of flaring device 18 has an axial hole 68 bored through the rear portion thereof, which corresponds in diameter to the output shaft 70 of the speed reduction unit 16 for mating therewith. A key way 72 is provided in the end portion of output shaft 70 and a corresponding threaded hole 74 is provided in the cylindrical portion 26 through which an Allen head screw 76 is threadably engaged so that it may be adjusted upwardly or downwardly to permit axial movement of the flaring head 18 relative to the output shaft 70, but will limit the movement by contact between the bottom end of the Allen screw 76 and the ends of the key way 72.

This axial movement permits the flaring head 18 to move rearwardly relative to the speed reduction unit 16 a sufficient amount that the radial thrust bearing 78, press fitted in the rear end of the cylindrical portion 26 will contact the plate 80 secured to the speed reduction unit 16. The bearing 78 is a radial thrust type of bearing which permits the flaring member 18 to rotate freely while the axial thrust due to contact with the plastic tubing is taken up by the plate 80 rather than along the output shaft 70, thus reducing wear on the internal parts of the speed reduction unit 16. The plate 80 has an opening 82 in the central portion thereof which permits the output shaft 70 to pass therethrough without contact.

Figure 2:
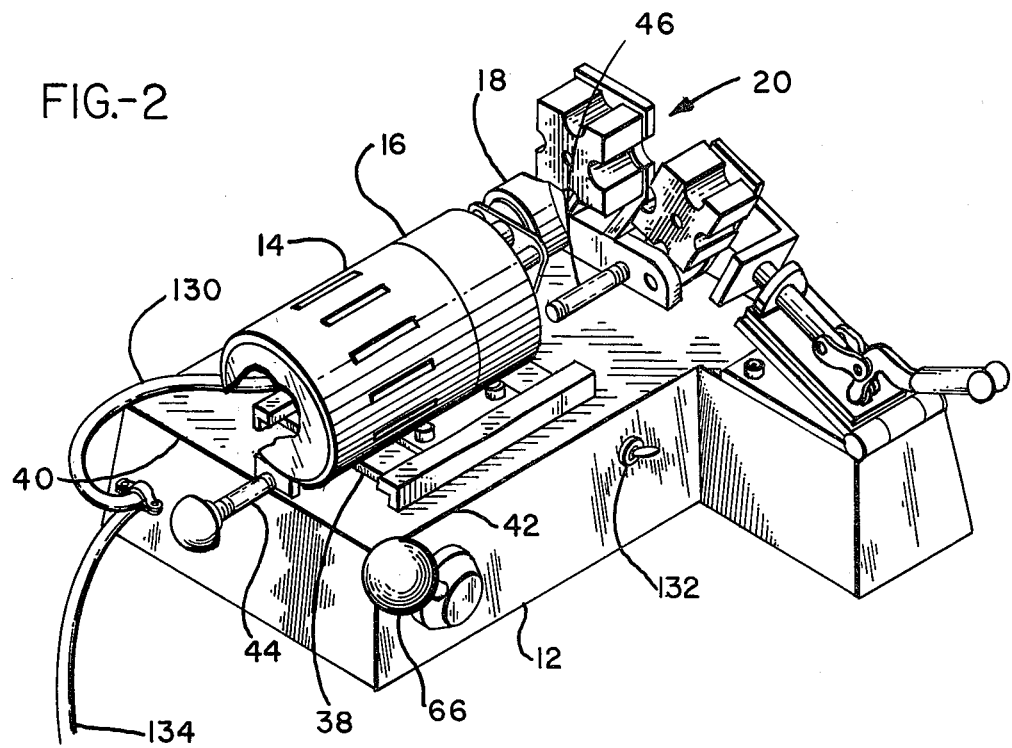
FIG. 2 is a pictorial view of the embodiment illustrated in FIG. 1.
Figure 3:
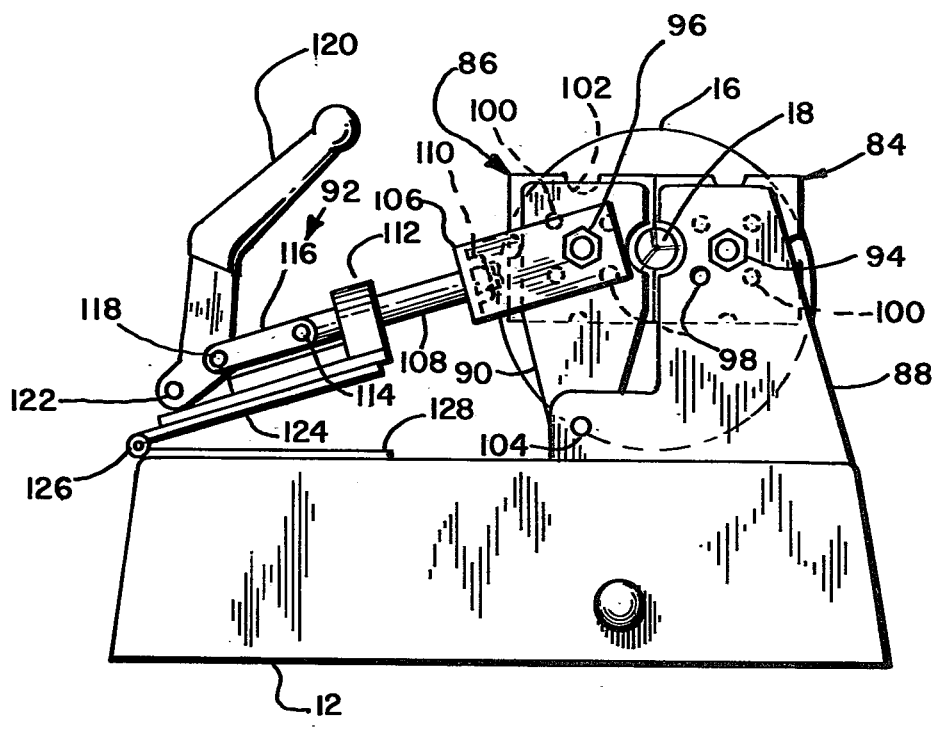
FIG. 3 is a front elevation of the embodiment illustrated in FIG. 1.

The die blocks 20, which are best illustrated in FIGS. 2 and 3, basically comprise a pair of adjustable die members 84 and 86, a stationary support 88, a rotatable support 90 and an over-center cam locking mechanism 92. The adjustable die members 84 and 86 are rotatably supported by support members 88 and 90 respectively, by means of bolts 94 and 96.

A pair of ball detent members 98 are provided to hold the die members 84 and 86 in a desired position, with indentations 100 being provided at appropriate places in each of the die members to hold the die members in a desired position.

Each die member 84 and 86 has a semicylindrical opening 102 defined in each side surface thereof with an axis parallel to the axis of rotation of the block. Each opening 102 has a corresponding diameter opening on the other block so that when the side surfaces of corresponding openings are adjacent one another, the pair of openings will define a cylindrical bore of a diameter sufficient to clamp a corresponding diameter of plastic tubing so as to hold the tubing stationary during the flaring of an end portion thereof.

The openings 102 may be of any desired size, but are customarily produced in the sizes which correspond to standard tubing sizes between a ¼ of an inch and 1½ inch diameter.

The rotatable support member 90 which supports die member 86 is rotatably mounted to the frame member 12 by means of pin 104 so that the die member 86 may be pivoted away from die member 84 to permit a piece of tubing to be laterally inserted into the die blocks 20 when the support member 90 and die member 86 are pivoted away.

The over-center cam locking mechanism 92 has an L-shaped bracket 106 pivotally attached to support member 90 by means of bolt 96. A rod 108 is secured by means of bolt 110 to the foot portion of bracket 106. The rod 108 is slidably mounted in a U-shaped bracket 112 formed integrally with the leg portion of bracket 106, and is pivotally connected by pin 114 to lever 116.

Lever 116 is pivotally connected at the opposite end by pin 118 to lever arm 120. Lever arm 120 is in turn pivotally connected by pin 122 to a rotatable base plate 124. The U-shaped bracket 112 is also secured to the rotatable base plate 124, and the rotatable base plate 124 is pivotally connected by pin 126 to stationary base plate 128 secured to the frame member 12.

The over-center cam locking mechanism 92 is so designed that when lever arm 120 is rotated clockwise to the position shown and as viewed in the direction of FIG. 3, it will force the die member 86 to contact die member 84 with the final movements of lever 120 producing an over-center cam locking position between the pivotal points of lever arm 120 and 116 in a manner well known in the art.

The motor is supplied with electrical power through cable 130 which is connected to an on/off toggle switch 132 in turn supplied with power from an outlet by a cable 134.

In operation, the flaring head 18 is positioned in the rearmost position by rotating handle 66 in the counterclockwise direction as viewed in FIG. 1. Depending upon the diameter of tubing to be flared, it may be necessary to retract limit screw 44 to permit the flaring head 18 to be moved rearwardly for larger diameter tubing, or to be moved forwardly for smaller diameter tubing so as to minimize the degree of rotation of handle 66 necessary to move the slide member 38 between the rearmost position and the foremost position.

The forward limit screw 66 can likewise be adjusted depending upon the diameter of tubing to be flared, so that if a larger diameter tubing is to be flared, the forward stop can be moved inwardly to increase the distance between the flaring head 18 and the back surface of the die blocks 20, or where a smaller diameter tubing is being flared, the limit screw 46 can be screwed outwardly to reduce the distance between the flaring head 18 and the back surface of the die blocks 20. The actual forward limiting position established by limit screw 46 can be varied somewhat for a given size of tubing and still produce a satisfactory flare on the tubing. The easiest way of establishing a desired flare is on a trial and error basis until the desired effect is obtained. Calibration marks may be provided on the frame member 12 for setting the limit of movement of the slide member 38 at the appropriate spot depending on the diameter of tubing.

In any event, once the slide member 38 is disposed in its rearmost position by the movement of handle 66, the over-center cam locking mechanism 92 is moved so that the lever arm 120 is in its rearmost position counter clockwise as illustrated in FIG. 3 causing the support 90 and die member 86 to be rotated outwardly from support 88 and die member 84, as illustrated in FIG. 2.

Plastic tubing can then be inserted in the opening 102 with the desired selection of corresponding openings 102 being disposed so that they will be in adjacent mating surfaces when the die members 84 and 86 are moved together. Once the tubing is in position, lever arm 120 is rotated clockwise as viewed in FIG. 3 until the die members 84 and 86 come in contact with the plastic tubing so as to grasp it. The overcenter cam locking mechanism 92 will then hold the die members 84 and 86 in gripping engagement with the plastic tubing to prevent it from rotating during flaring.

Handle 66 is then rotated clockwise as viewed in FIG. 1, so that the flaring head 18 comes in contact with the end portion of the plastic tubing, and a flare is produced by the undulating movement of the plastic tubing as described above.

Although the foregoing is an illustration of the preferred embodiment, many variations are possible. All such variations as would be obvious to one skilled in this art are intended to be included within the scope of the invention as defined by the following claims.

I claim:

1. Apparatus for flaring the end of a length of cylindrical plastic tubing comprising:
    a frame member;
    a slide member movably mounted on said frame member for translational movement relative thereto;
    means for moving said slide member;
    motor means mounted on said slide member for movement therewith;
    speed reducing means mounted on said slide member in driven engagement with said motor means and having a power output shaft axially aligned with the direction of movement of said slide member;
    flaring means in rotationally driven engagement with said power output shaft for axial rotation about a fixed axis aligned with the central axis of said cylindrical plastic tubing and movable translationally along said axis upon movement of said slide member, said flaring means having a generally conical working face coaxially disposed with said axis and located on one end of said flaring means remote from an end thereof in engagement with said power output shaft;
    means secured to said frame member for clamping a length of tubing to be flared in axial alignment with said axis of said flaring means with an unsupported end portion of the tubing projecting from said clamping means toward said flaring means, said clamping means including a pair of die blocks one of which is rotatable around a stationary central axis thereof and the other of which is movable into registry with said one, each said die block having a plurality of mating semi-cylindrical dies formed in the outer peripheral edge portions thereof and selectably engagable in alignment with said axis of rotation of said flaring means so as to hold any of a plurality of predetermined sizes of plastic tubing in alignment with said flaring means, said clamping means further including cam locking means associated with said other die block for moving said other die block into and out of engagement with said one die block and for holding a pair of said mating dies in clamping engagement with said plastic tubing; and
    means operable to move said slide member between a rearmost position in which said flaring means is disposable sufficiently remote from said clamping means that a tubing may be positioned in said clamping means and a foremost position in which flaring of said tubing can be completed.

2. Apparatus as defined in claim 1 including:
    adjustable limit means for limiting the forward and rearward movement of said slide member between desired formost and rearmost positions.

3. Apparatus for flaring the end of a length of plastic tubing comprising:

a frame member;

a slide member movably mounted on said frame member for translational movement relative thereto;

means for moving said slide member;

motor means mounted on said slide member for movement therewith;

speed reducing means mounted on said slide member is driven engagement with said motor means and having a power output shaft axially aligned with the direction of movement of said slide member;

flaring means in rotationally driven engagement with said power output shaft and movable therewith upon movement of said slide member, said flaring means having a central axis and a generally conical coaxial working face located on one end of said flaring means remote from an end in engagement with said power output shaft;

means secured to said frame member for clamping a length of tubing to be flared in axial alignment with said central axis of said flaring means with an unsupported end portion of the tubing projecting from said clamping means toward said flaring means;

means operable to move said slide member between a rearmost position in which said flaring means is disposable sufficiently remote from said clamping means that a tubing may be positioned in said clamping means and a foremost position in which flaring of said tubing can be completed; and said means for moving said slide member relative to said frame further includes:

a rigid mounting bracket secured to and extending downwardly from the bottom surface of said slide member;

first and second shafts mounted on said frame member for axial rotation and disposed in spaced relation on opposed sides of said mounting bracket in a plane parallel to the plane of movement of said slide member;

sprocket means secured to each of said shafts;

chain means in driven engagement with said sprocket means and secured to said mounting bracket so that rotation of said shafts causes translational movement of said slide member; and means for rotating one of said shafts.

4. Apparatus as defined in claim 3 wherein said slide member moving means includes means for moving one of said shafts relative to the other in the plane in which they are disposed so that said chain means may be tightened.

5. Apparatus as defined in claim 1 wherein said flaring means further comprises:

a working face having a plurality of spaced conical lands extending at a greater angle than remaining interspersed relieved surface portions relative to said axis of said flaring means and extending substantially from the apex of said conical working face.

6. Apparatus as defined in claim 5 wherein the angle of said conical lands relative to said axis is substantially in the range of 65° to 75°.

7. Apparatus as defined in claim 6 wherein the angle of said relieved surface portion relative to said axis is substantially 58.5°.

8. Apparatus as defined in claim 1 wherein said flaring means further comprises a generally conical working face having a plurality of relieved areas, pairs of which are spaced between said conical lands, said relieved areas extending at a compound angle relative to said central axis such that they are disposed between a plane defining a flat segment between adjoining said lands converging at the apex of said working face and a position in which their line of intersection relative to said central axis is approximately 25° converging at the apex of said working face.

9. Apparatus as defined in claim 9 wherein a groove is formed at the line of intersection of adjacent said relieved areas in each said pair thereof.

10. Apparatus as defined in claim 1 wherein said cam means includes an over center cam locking mechanism.

* * * * *